Oct. 24, 1944. D. BREWER 2,360,930
DEHYDRATOR
Filed June 25, 1943 3 Sheets-Sheet 2
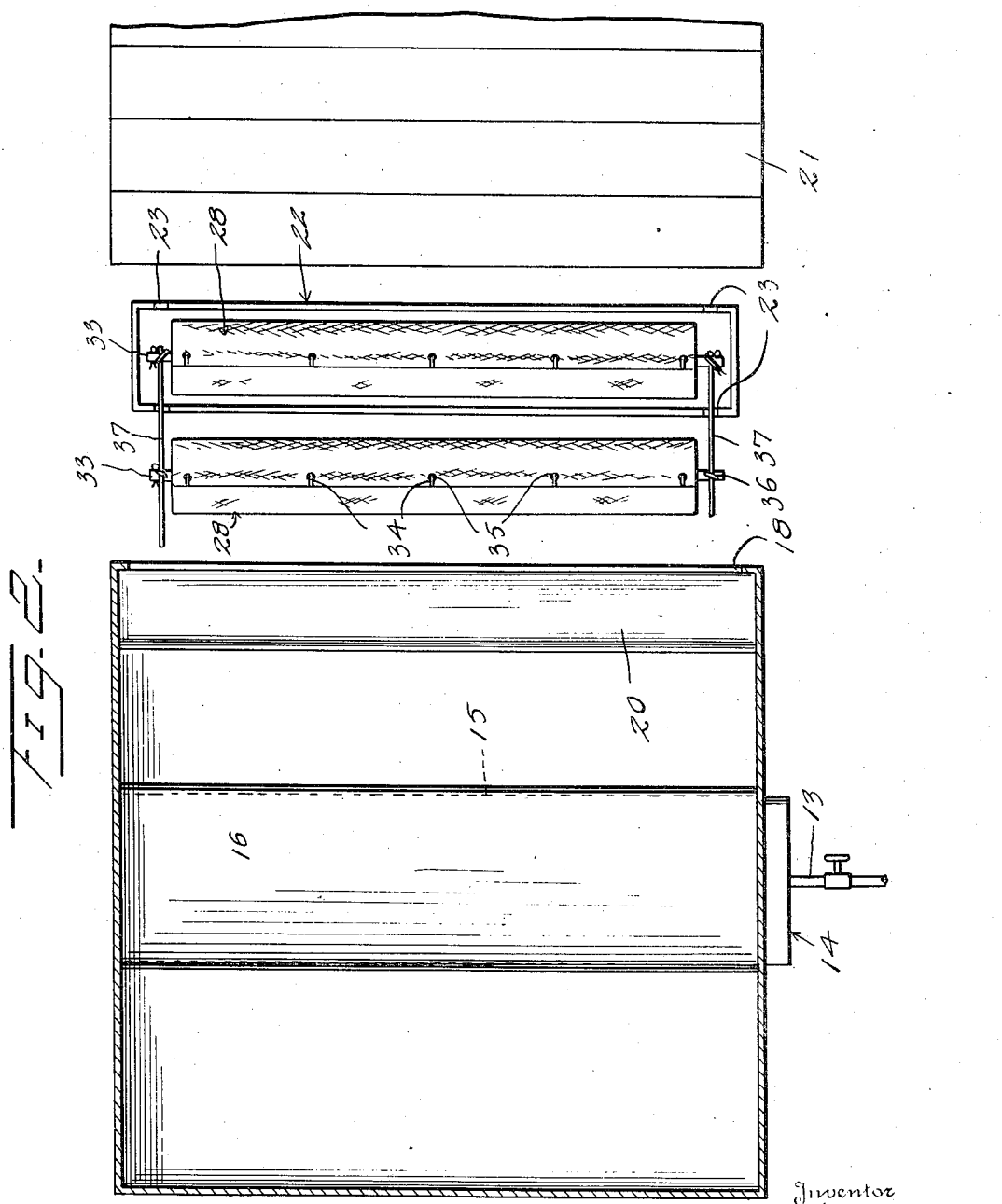

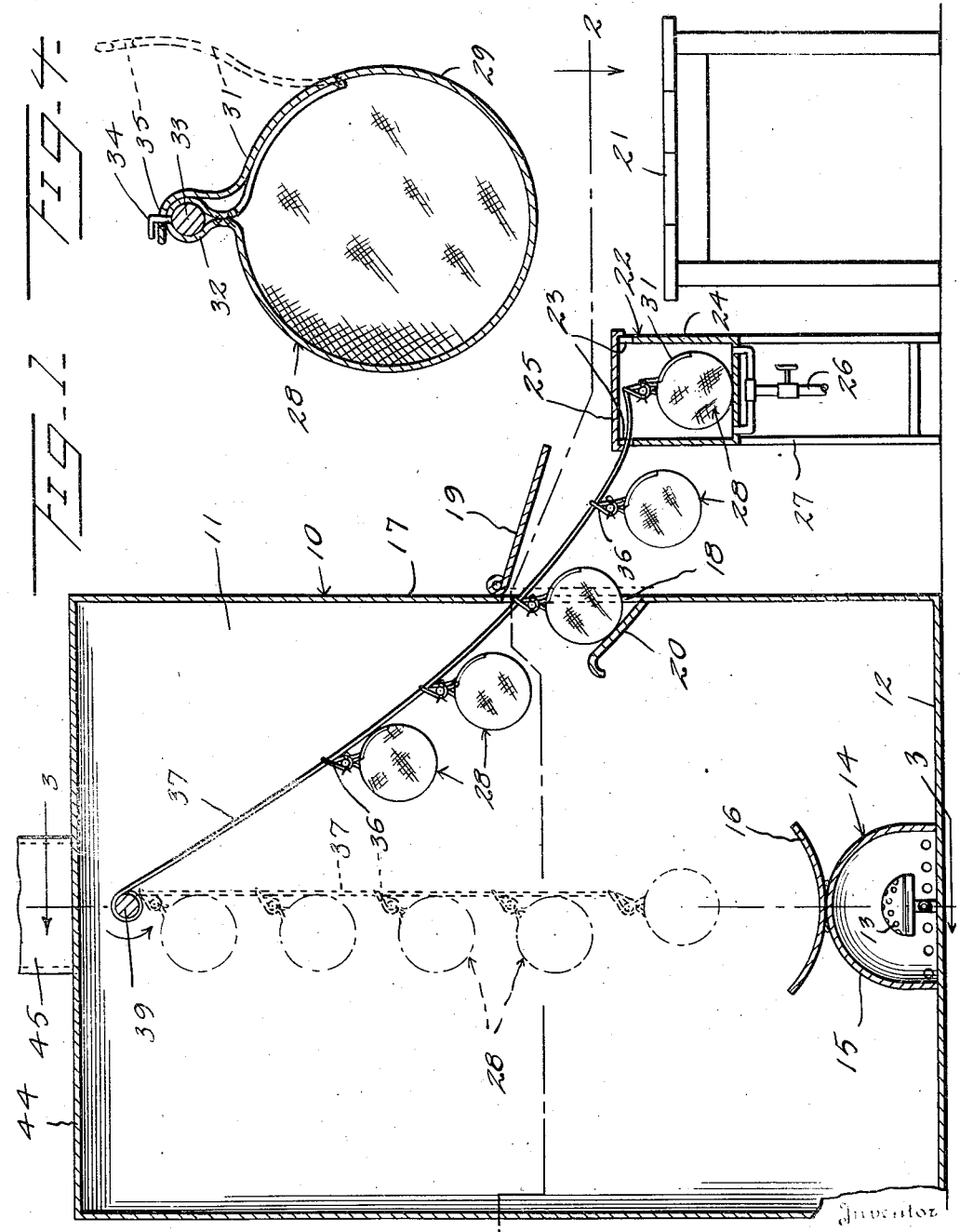

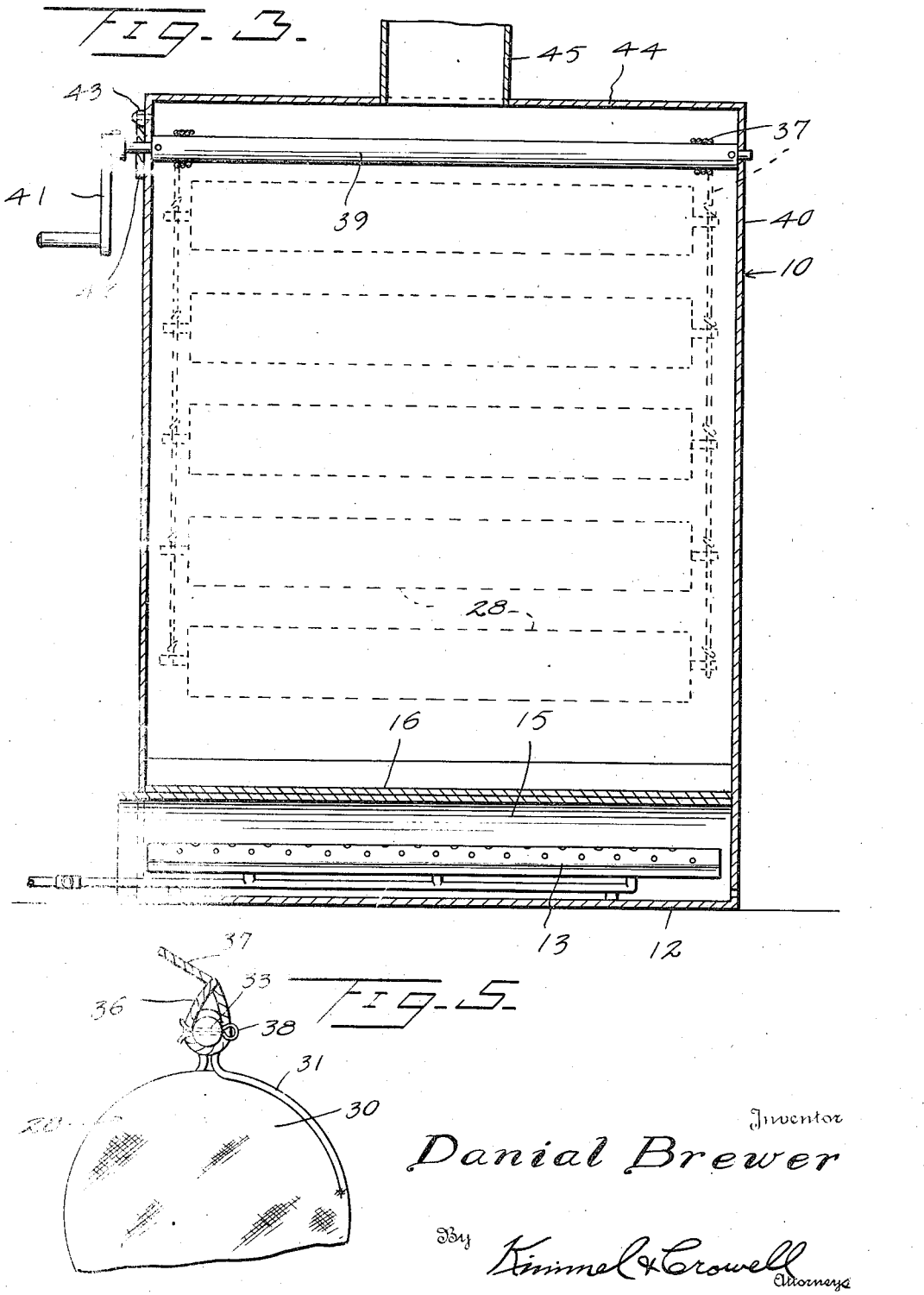

Patented Oct. 24, 1944

2,360,930

UNITED STATES PATENT OFFICE 2,360,930

DEHYDRATOR

Danial Brewer, Longview, Tex., assignor of one-half to Edward Fanning Wheat, Kilgore, Tex.

Application June 25, 1943, Serial No. 492,293

3 Claims. (Cl. 34—68)

This invention relates to food dehydrators.

An object of this invention is to provide dehydrating apparatus which is simple in construction and embodies a minimum of critical material.

Another object of this invention is to provide a dehydrator which includes a drying chamber, and means for suspending food containers in the chamber, the food containers being filled on the exterior of the chamber and drawn through a trap door into the chamber.

A further object of this invention is to provide dehydrator apparatus which includes a drying chamber, a blanching or steaming chamber exteriorly of the drying chamber, a plurality of flexible pervious containers for the food products, and flexible suspension means for the containers.

A further object of this invention is to provide an improved method of dehydration which includes the initial preparation of the food products, placing the prepared products in flexible containers, sterilizing the products in a steam chamber, and finally suspending the containers in a heated chamber.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that changes, variations and modifications may be resorted to which fall within the scope of the invention, as claimed.

In the drawings:

Figure 1 is a vertical section taken through dehydrating apparatus constructed according to an embodiment of this invention;

Figure 2 is a sectional view taken on the line 2—2 of Figure 1;

Figure 3 is a sectional view taken on the line 3—3 of Figure 1;

Figure 4 is a transverse sectional view, on an enlarged scale, of one of the food containers; and Figure 5 is a fragmentary end elevation of one of the food containers.

Referring to the drawings the numeral 10 designates generally a housing which is formed with a drying or heating chamber 11. The housing 10 has mounted on the bottom wall 12 thereof a heating means, generally designated as 14. The heating means 14 includes a burner 13 which may be connected to a suitable source of heating supply such as gas or steam, and the burner 13 is mounted in a dome-shaped housing 15.

An arcuate shield or deflector 16 is secured to the top of the heater housing 15 having the concave side thereof uppermost. The housing 10 has formed in the top wall 17 thereof, an opening 18 and a pivoted trap door 19 is secured to the upper edge of the opening 18. An inwardly and upwardly directed combined shield and guide 20 is secured to the inner side of the front wall 17, the shield deflecting the heated air as it rises from the heater 14, and preventing rising hot air from passing out of the opening 18.

A food preparing table 21 is disposed exteriorly of the housing 10, and forwardly of the front wall 17. The table 21 is of sufficient length so that the food, subsequent to treatment thereof, may be properly prepared, including drying of the food. A steam chamber 22 is interposed between the table 21 and the housing 10. The steam chamber 22 includes an upwardly opening housing having notches 23 in the side walls 24 thereof. A flanged closure or top 25 is adapted to engage over the upper open end of the steam chamber 22 and substantially cover the slots 23. The steam chamber 22 is connected by means of a pipe 26 to a suitable source of steam supply. The steam chamber 22, in the present instance, is supported by supporting legs 27.

The food which is to be dehydrated is, after being properly prepared on the table 21, placed in perforate containers, generally designated as 28. These containers 28 are, in the present instance, formed of a cylindrical wall 29 which may be formed of fabric, and is also formed of opposite end walls 30. A closure 31 is formed integral with the cylindrical wall 29, and is swung to open position at the time the products are initially placed in the container 28. The container 28 is formed with an elongated longitudinal tunnel 32 through which a rigid rod 33 is extended. The rod 33 is provided with a plurality of longitudinally spaced apart hooks 34 and the closure 31 is formed with openings 35 so that the free edge of the closure 31 may be engaged with the hooks 34 to hold the closure in closed position. The ends of the rod 31 project beyond the opposite ends of the container 28 and are adapted to engage in loops 36 which are formed in a pair of flexible suspending members 37. The loops 36 are held on the rod 33, by means of cotter pins 38 or other suitable fastening means. The cables or flexible members 38 are wound about a winding shaft 39, which is journalled through the side walls 40 of the housing 10, adjacent the upper portion of the housing. A crank 41 is secured to the shaft 39 and a ratchet 42 may also be secured to the shaft 39 exteriorly of the housing 10, the ratchet 42 having a pawl 43 engaged therewith so as to hold the shaft 41 against rotation in one direction. The top wall 44 of the housing 10 is provided with an outlet 45 for permitting the heated air to be exhausted from the housing.

As shown in Figure 1, the cables or flexible suspending means 37 are formed with a series of spaced apart loops 36 so that a plurality of containers 28 may be suspended in vertically spaced apart parallel relation within the housing 10, and above the heating member 14.

In the use and operation of this dehydrator apparatus the food products are initially prepared on the table 21, and a container 28 is placed on the table 21, and filled with the prepared food product. The filled container is then moved forwardly by winding the shaft 39 and the filled container is then dropped into the steam chamber 22. The food products are subjected to a steam treatment for a suitable length of time, and then the food container 28 is moved into the housing 10, the trap door 19 being raised and the shaft 39 being wound to pull the steamed container and food products into the housing 10. When all of the containers are filled and have passed through the steam chamber, the trap door 19 is closed and the containers will then be suspended, as shown in dotted lines in Figure 1. The heat in the chamber 11 will evaporate the moisture from the food products, the initial steam treatment preventing any case hardening of the food products when the latter are suspended within the drying chamber 11.

It will, of course, be understood that as many supporting or suspending members may be provided in the housing 10 as may be desired, there being shown only one pair of suspending members for suspending a single column of food containers. The provision of the rigid rods 33 which extend through the tunnels 32, prevent any sagging of the filled containers when suspended within the drying chamber. It will, of course, be understood that if desired suitable forcible exhaust means may be provided for exhausting the air in the drying chamber 11 or for circulating the heated air within the chamber.

Where a circulating means is provided, a valve or damper may be mounted in the outlet 45, to prevent the complete exhaust of the heated air, but permit the exhaust of a predetermined quantity of such heated air.

I claim:

1. Dehydrating means comprising in combination a drying chamber, means for heating said chamber, a steam chamber spaced from said drying chamber, said drying chamber having an opening in its side wall, a hinged closure for said opening, a plurality of elongated perforate food containers, a pair of spaced container suspension members, means securing said containers to said suspension members in superposed relation, and winding means for said suspension members, said suspension members having a length sufficient to provide for extension thereof through the side wall opening of the chamber with said closure in open position and initial engagement of said containers in said steam chamber.

2. In dehydrating apparatus, a perforate flexible food container, a rigid rod extending through said container and projecting beyond the ends of the container, and a pair of supporting elements engageable with the projecting ends of said rod, said container including a flexible closure rod, adapted, when in closed position, to overlap said rod, and means carried by said rod for holding said closure in closed position.

3. Dehydrating means comprising a housing, heating means in said housing, a flexible elongated perforate food container, a rigid rod carried by said container, and means engageable with said rod for suspending said container above said heating means, said suspending means including a crankshaft carried by said housing, a pair of flexible members wound about said shaft, a loop carried by each flexible member for receiving the ends of said rod whereby said container may be suspended in adjusted position above said heating means, a flexible closure for each container overlapping said rod and means carried by said rod for holding said closure in closed position.

DANIAL BREWER.